US006099021A

United States Patent [19]

Benoit

[11] Patent Number: 6,099,021

[45] Date of Patent: Aug. 8, 2000

[54] ACCESSORY FOR SUPPORTING A WHEELCHAIR IN A STABLE RECLINED POSITION

[76] Inventor: Robert Benoit, Rue du Chateau F-21450, Billy-les-Chanceaux, France

[21] Appl. No.: 09/043,535

[22] PCT Filed: Sep. 20, 1996

[86] PCT No.: PCT/FR96/01474

§ 371 Date: Mar. 23, 1998

§ 102(e) Date: Mar. 23, 1998

[87] PCT Pub. No.: WO97/10791

PCT Pub. Date: Mar. 27, 1997

[30] Foreign Application Priority Data

Sep. 21, 1995 [FR] France .................................. 95 11247

[51] Int. Cl.[7] ............................ B62B 1/00; B62K 15/00; B60T 1/14; A47C 3/00

[52] U.S. Cl. .......................... 280/647; 280/293; 280/298; 188/5; 297/310; 297/DIG. 4

[58] Field of Search .................................... 280/650, 647, 280/304.1, 250.1, 293, 47.12, 47.16, 47.2, 47.33, 755, 763.1, 298; 297/310, 394, 397, 399, 402, DIG. 4; 188/5

[56] References Cited

U.S. PATENT DOCUMENTS

| | | | |
|---|---|---|---|
| 3,415,531 | 12/1968 | Kiel . | |
| 3,848,883 | 11/1974 | Breacain | 280/250.1 |
| 3,889,964 | 6/1975 | Pitts, Jr. | 280/250.1 |
| 4,227,740 | 10/1980 | East . | |
| 4,565,385 | 1/1986 | Morford | 280/250.1 |
| 4,830,567 | 5/1989 | Rachman . | |
| 4,834,411 | 5/1989 | Willey et al. . | |
| 5,137,295 | 8/1992 | Peek | 280/250.1 |
| 5,181,733 | 1/1993 | Tague | 280/250.1 |
| 5,294,141 | 3/1994 | Mentessi et al. | 280/250.1 |
| 5,490,715 | 2/1996 | Opsvik | 297/310 |

FOREIGN PATENT DOCUMENTS

| | | |
|---|---|---|
| 92 17 764 | 4/1993 | Germany . |

*Primary Examiner*—Lanna Mai
*Assistant Examiner*—Jeffrey J. Restifo
*Attorney, Agent, or Firm*—Young & Thompson

[57] ABSTRACT

An accessory is provided for supporting a four-wheeled wheel-chair in a stable position in which it is tilted backwards and thus enables a disabled user to assume a relaxing recumbent posture. The accessory having a swing leg (3) that swings freely in the vertical plane of symmetry passing through the longitudinal axis of the wheelchair about a perpendicular and horizontal pivot rod (4) substantially located at the top of the back rest (9) between the two side frame posts that support the back rest (9), via rapid or permanent fastening elements (5, 6, 7, 8). The lower portion of the swing leg (3) advantageously has an adjustable length and is provided with a stabilizer foot (10).

10 Claims, 2 Drawing Sheets

ACCESSORY FOR SUPPORTING A WHEELCHAIR IN A STABLE RECLINED POSITION

FIELD OF THE INVENTION

The present invention relates to a piece of additional equipment or accessory for a four-wheeled wheelchair designed to retain the chair in a stable backward-tilting position to provide the disabled user with a relaxation position.

BACKGROUND OF THE INVENTION

Wheelchairs are known in the prior art wherein, of the four wheels, the rear pair arc used to propel the chair, usually manually, while the forward pair provide stability and a means for steering the assembly. This type of chair is an essential tool for those who do not have, or who have lost, the use of their legs. For these users the wheelchair is not simply a means of locomotion; it should also provide the most comfortable seated position possible. This function of the chair should enable the user to perform all the activities of everyday life such as eating, working, reading, writing, watching television, etc.

Hitherto, such chairs have not been designed to allow for the relaxation and rest that able-bodied people enjoy by using armchairs, sofas, divans, etc. While this relaxation function is usually incompatible with requirements related to mobility such as lightness, maneuverability, ease of folding or collapsing, robustness and compactness and it is often pointed out that wheelchair users are denied positions of relaxation, being compelled to remain in the seated position all day.

SUMMARY OF THE INVENTION

To date, no apparatus is known that could easily equip standard wheelchairs to provide users with this relaxation function. It is the precise object of the present invention to provide a piece of additional equipment for four-wheel chairs designed to retain the chair in a backward-inclined position to relax the disabled user. The invention is characterized by a pivoting prop that swings freely in the plane of vertical symmetry, passing through the longitudinal axis of the chair, on a pivoting axle perpendicular to the plane of the prop and located approximately at the height of the top of the backrest between the two lateral struts of the chassis supporting the said backrest, retained by snap or definitive means, pivoting prop being advantageously of adjustable length and provided in its lower section with a stabilizing foot.

According to the invention, the stabilizing foot has the overall shape of an inverted letter T. This foot is fastened to the end of the pivoting prop such that the height of the prop/foot assembly is adjustable and the horizontal base of the inverted T is normally in the longitudinal axis of the chair to provide an optimal bearing surface on the ground and coordinating with the bearing surfaces of the rear wheels of the chair when it is the relaxation position.

It will be clear than in a particularly advantageous variant of the invention a head-rest is mounted and fastened to the pivoting axle of the prop by fastening means that allow for angular adjustment around the axle to constitute an extension of the backrest when it is moved into the relaxation position or to allow for folding of the chair into the carrying position.

Among the main characteristics of this type of apparatus are the following:

- it may be adapted to all existing wheelchairs by means of small adapters permanently fitted to the lateral struts of the chair bearing the handles, or by means of simple machining carried out on the struts.
- it may be rapidly fitted onto a chair equipped with the adapters; this operation may be carried out by users themselves to the degree to which they enjoy freedom of movement. Otherwise, the operation may be carried out by a helper with no special qualifications.
- once the equipment has been installed to allow for normal, habitual use of the chair.
- to provide an adjustable relaxation position by tilting the chair backwards, as explained below. The equipment naturally comprises all adjustments necessary to adapt it to all types of user morphology.
- to ensure complete safety of tilting operations, both when the wheelchair is in normal use and in the relaxation position.
- to ensure rapid, safe restoration of the chair to its normal four-wheel position.
- to be usable on all surface, including uneven ground.
- to fold for carrying or storage into the space intended by the wheelchair builders.

BRIEF DESCRIPTION OF THE DRAWINGS

Other characteristics of the invention will emerge from the following description of a particular variant that, although preferred, is non-limitative. The description refers to the attached figures where.

DETAILED DESCRIPTION OF THE INVENTION

Figure 7:
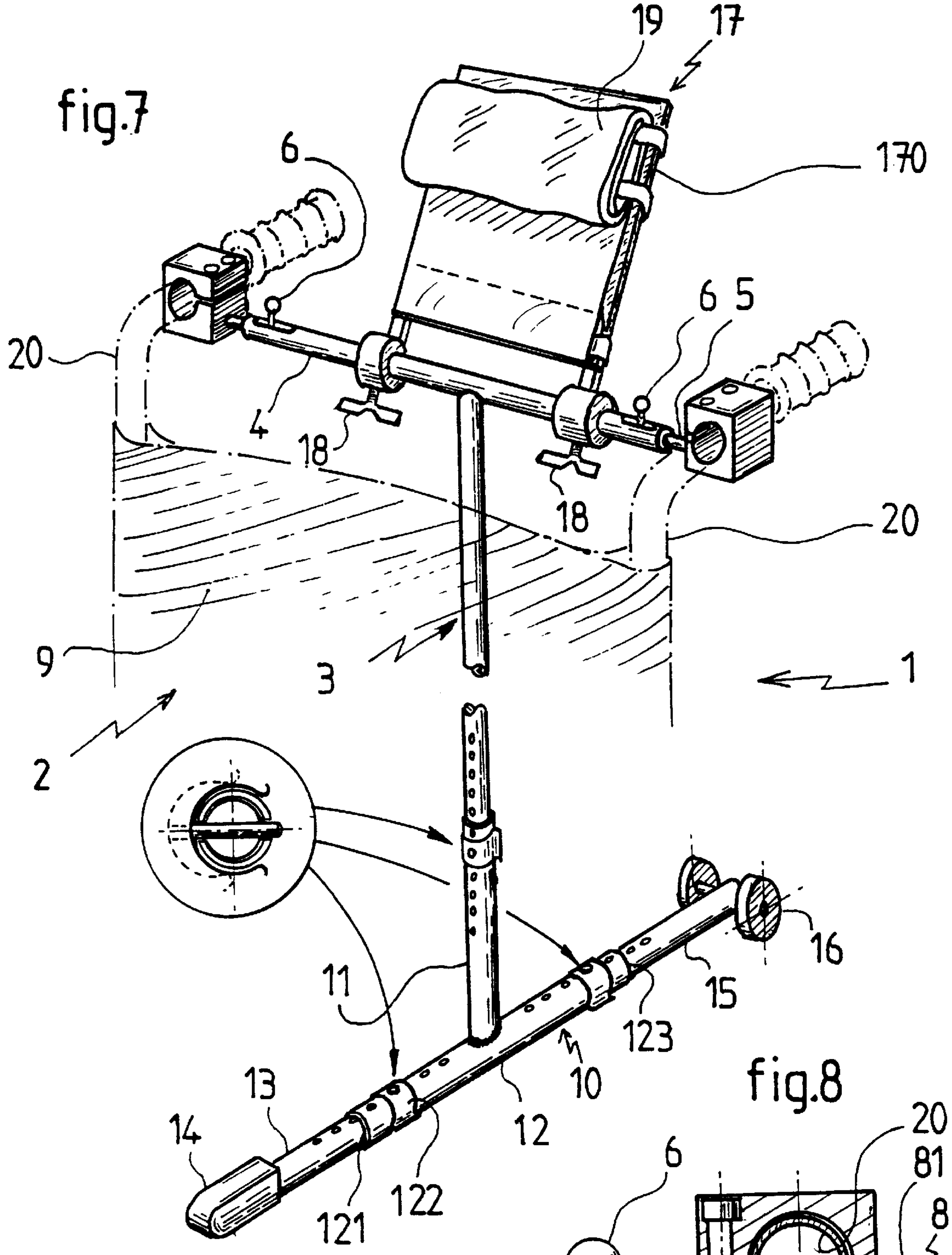
FIG. 7 is a perspective view of the apparatus of the invention; the upper section of the wheelchair to which the invention has been fitted is shown in dotted lines.
Figure 8:
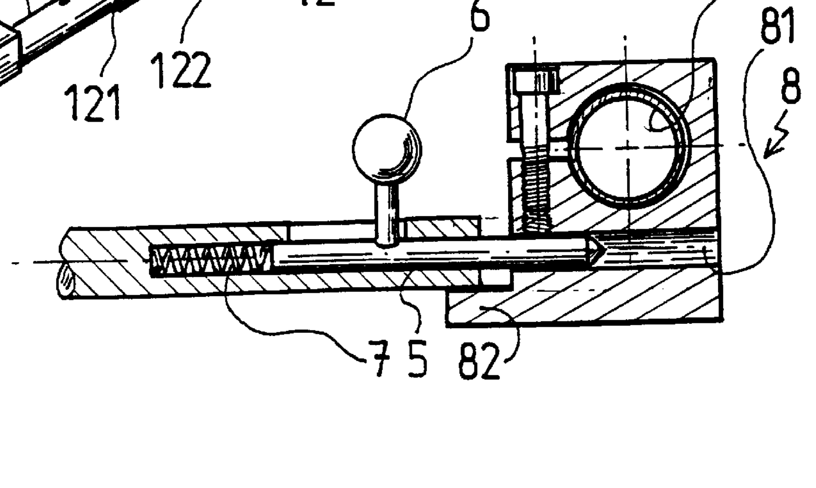
FIG. 8 is a partial view of a cross-section of an adapter used to fit the equipment to the section of the lateral struts designed to receive the handles.

As shown in FIG. 7, the accessory 1, which is capable of being easily fitted to a standard wheelchair 2 to provide the disabled user with an additional relaxation function consists of a pivoting prop 3 capable of swinging freely in the plane of vertical symmetry of chair 2 on a horizontal axle 4, each end of which is fitted with an axle 5 capable of axial displacement initiated by a vertical radial control knob 6 coordinating with a spring 7 that maintains the axles 5 in the extended position. In order to fit horizontal axle 4 to the lateral struts 20 of wheelchair 2, adapters 8 are provided and fastened using standard systems for gripping the tubes of lateral struts 20; adapters 8 are provided with a horizontal bore 81 to receive axle 5 of the equipment 1, previously fitted by means of two lower stops 82 that support the entire equipment assembly 2 just before introduction of the axles 5 into horizontal bores 81. It will be clear that the apparatus can be simply removed by freeing the axles 5 from horizontal bores 81 by activating control knob 6 When spring 7 is compressed axle 5 can be freed from horizontal bore 81.

Pivoting prop 3, fastened to horizontal axle 4 by any known means, for example, welding, extends downwards to a length approximately equivalent to the height of standard backrest 9 of wheelchair 2. The pivoting prop 3 is advantageously constructed from a tube whose mechanical characteristics may be calculated by those skilled in the art to bear the vertical loads resulting from the specific position of the user in the wheelchair in the relaxation position.

The end of prop 3 is fitted with a stabilizing foot 10 advantageously constructed from tubing and having the overall shape of an inverted letter T. The material and measurements selected to construct the foot to withstand the forces transmitted by the prop 3 are as mentioned above. The vertical section 11 of foot 10 fits into the free end of prop 3 thereby making it possible to adjust the total length from horizontal axle 4 to the lower section of foot 10, the horizontal section of which 12 rests on the ground. Once the horizontal section 12 is fitted to prop 3, it should be in the plane of vertical symmetry of the wheelchair 2.

Foot 10 is fastened at the required height of prop 3 by means of successive transverse bores pierced along the entire length of vertical section 11 of foot 10 and along the entire length of prop 3, said bores being lined up before being fitted with a removable locking pin apparatus such as the example shown in the enlargement in FIG. 7. Those skilled in the art are well-acquainted with this type of locking pin apparatus and will easily adapt it for the present purpose.

The working horizontal section of stabilizing foot 10 consists of a first central section 12 fastened at about the mid-point to vertical section 11 of foot 10. It will be noted that the vertical section ill and the horizontal section 12 are at 90° to one another; it will, however, be understood that means for adjusting this angle may be provided, incorporating suitable fastening means, to improve the equipment further, as explained below.

A rigid rod 13 is fitted onto the end 121 of central section 12 of foot 10 that passes under the seat of the wheelchair. This rod 13 is capable of sliding into section 12, where it is firmly held by means of a locking pin apparatus 122 similar to that already described in relation to vertical section 11. The free end of rod 13 is fitted with an anti flip device 14 such as a rubber shoe that extends several centimeters along the ground under the rod and covers the tip of rod 13. As will be seen below, it also acts as a center of rotation (see reference P in FIG. 7) for the equipment 1 when the wheelchair is being returned to its normal position after use in the relaxation position.

At the other end 123 of the central section 12 of foot 10, facing outwards (i.e. towards the rear of wheelchair 2) is fastened a rod 15 of the same type as internal rod 13 whose free end is fitted with at least one small wheel 16 designed to facilitate, as will be explained below, the positioning of foot 10 so that it bears firmly on the ground while the wheelchair 2 is being tilted backwards into the relaxation position. It will be clear that the length of the outer horizontal arm of foot 10 can be adjusted in the same way as the other arms of the T-shape of the foot 10.

In order to provide the user with a maximum level of comfort once the chair has been tilted into the relaxation position, a head-rest 17 extends the bearing surface of the backrest 9 in order to support the user's head and neck comfortably.

In a non-limitative variant of the invention, the head-rest 17 consists of a support board 170 made of the usual materials used for this purpose. Support board 170 is fastened to horizontal pivoting axle 4 bearing prop 3 as described above. Board 170 is fastened so that its angle can be adjusted on horizontal axle 4 by means of devices 18 that are well-known to those skilled in the art and which will not, therefore, be described here. Support board 170 is tilted so that the user experiences maximum comfort when the chair is tilted back on the prop in the relaxation position. It will be noted that when the prop is stowed away, i.e. the chair is used in the four-wheel position, the adjustment mechanism of the head-rest 17 as described above moves the support board 170 far enough from the user's head as to cause no interference with everyday movement The angle of support board 170 on horizontal axle 4 is normally only adjusted when the equipment L is first fitted to wheelchair 2. The user may, however, adjust it, even when moving or when in the seated position.

The head-rest 17 is also advantageously fitted with a cushion 19 to give the user added comfort Cushion 19 is made of 1–2 cm thick foam of a width equal to that of the support board 170. In a very simple variant of cushion 19, it may be attached either by means of straps, by other means well-known to those skilled in the art, or by Velcrox strips.

In an advantageous preferred embodiment of the invention, cushion 19 is constructed so that, once rolled, it has the overall shape of a diabolo or hourglass, i.e. a rotating hyperboloid, obtained by simply reinforcing the thickness of the foam at the edges of the rolled cushion.

Figure 1:
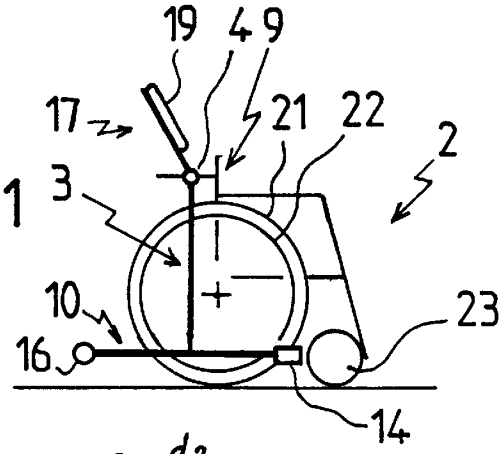
FIG. 1 is a schematic elevation of a four-wheeled wheelchair fitted with the apparatus of the invention; the chair is in the usual operating position.
Figure 2:
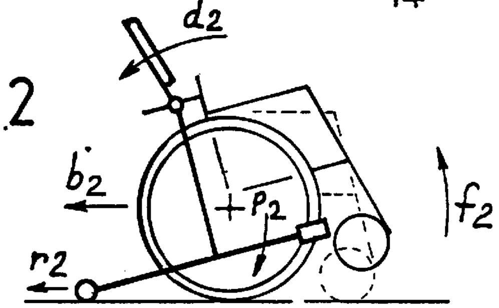
FIG. 2 is a schematic view identical to the previous figure showing an intermediate stage in which the wheelchair, fitted with the accessory of the invention, is tilted into the relaxation position.
Figure 3:
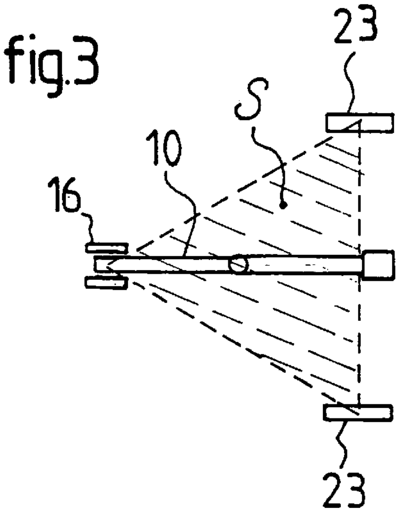
FIG. 3 is a top view of the bearing points on the ground of a wheelchair fitted with the equipment of the invention; the chair is in the final relaxation position and the figure shows the triangle of support points.

FIGS. 1 to 6 successively show the dynamic use of accessory 1 for wheelchair 2 to give it an additional relaxation function, passing through the successive stages in which the wheelchair moves from the standard four-wheel position (FIG. 1) into the tilted relaxation position (FIG. 3). The reverse procedure in which the chair moves from the relaxation position (FIG. 3) back into the standard four-wheel position (FIG. 1) is then described.

In FIG. 1 wheelchair 2 equipped with accessory 1 is in the standard four-wheel position and can be moved normally. The accessory 1 in no way interferes with the use of the chair since the stabilizing foot 10 is largely concealed by the chair seat and by the large wheels 21 of the chair 2. Furthermore, as will be seen below, the head-rest 17, adjusted as described above, is tilted well back so as not to obstruct the user during the performance of everyday tasks.

To adopt the final relaxation position shown in FIG. 3, the user must tilt wheelchair 2 backwards in the direction shown by arrows d2 and f2 of FIG. 2. The user can do this either with the aid of a helper or by using the technique well-known to wheelchair-users for navigating obstacles, i.e. by making the appropriate movement with the hand-grips 22 of the large wheels 21. When the chair is tilted, the stabilizing foot 10 is swung slightly backwards; gravity causes it to swing until the tip of its rear section fitted with a set of small wheels 16, touches the ground (this movement is shown by arrow b2 in FIG. 2). At this point the movement b2 of prop 3 continues to approach the vertical; this is made possible by the set of small wheels 16 that are in contact with the ground. Movement p2 continues until anti-slip shoe 14 reaches the ground, thereby bringing the wheelchair 2 into a stable tilted position as shown in FIG. 3.

Figure 4:
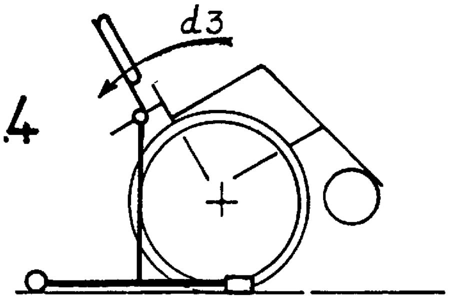
FIG. 4 is a schematic view identical to the to previous figures showing the wheelchair in the final relaxation position.

It will be seen that when wheelchair 2 is in the position shown in FIG. 3 it creates support surface S on the ground, composed of the two bearing points of large wheels 21 and small wheels 16. The support triangle S shown in FIG. 4 is such that the extension of the user's center of gravity from the chair 2 in the relaxation position always remains within surface S whatever movements the user makes in this special relaxation position.

Figure 5:
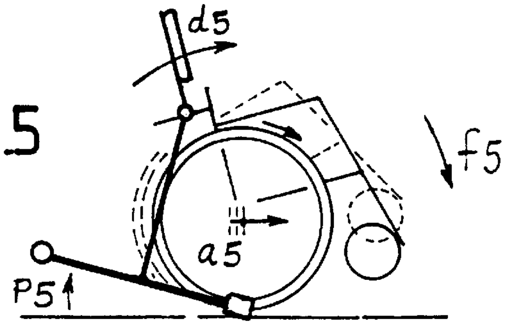
FIG. 5 is a schematic elevation of a wheelchair equipped with the invention in an intermediate position when returning to the normal position of use.
Figure 6:
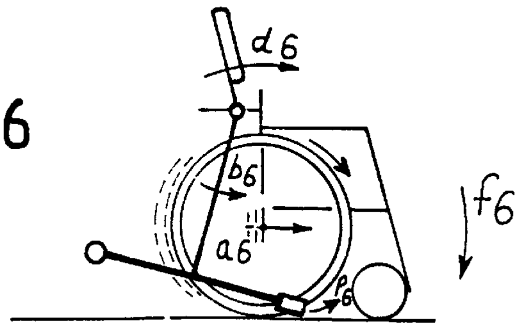
FIG. 6 is a view identical to the previous figure a moment later in the forward-tilting movement, before the wheelchair equipped with the invention returns to the fully-upright position.

Conversely, to regain the normal four-wheel position the user has a choice of two techniques (a third, calling upon the assistance of a helper, is clearly of no interest to the present discussion):

the first technique consists in making a sharp backward movement with the hand-grips 22; this immediately tilts the chair forward, bringing the accessory into the vertical rest position shown in FIG. 1 without the need for any intermediate stage the second technique consists in the user actuating the hand-grips 22 to move the wheelchair 2 forwards as seen in FIG. 5 and 6 that show the successive stages in regaining the normal position. As wheelchair 2 moves forward in the direction shown by arrow a5 of FIG. 5, the inner section of stabilizing foot 10 fitted with anti-slip shoe 14 is braced on the ground at fixed point P. This causes an upward rotation of foot 10 as shown by arrow p5 of FIG. 5; it also causes backrest 9 to move an equal distance as shown by arrow d5 of FIG. 5. This movement of backrest 9 in turn causes wheelchair 2 to tilt forward as shown by arrow f5 of FIG. 5, bringing the front wheels 23 of the chair gradually but firmly to the ground In the final stage shown in FIG. 6 in which the chair 2 returns to the four-wheel position, it will be seen that fixed point P used to move the back-rest, as shown by arrow d6 in FIG. 6, finally loses its grip on the ground. As the wheelchair continues to move forward (shown by arrow a6 in FIG. 6), the foot 10 loses its grip on the ground and swings as shown by arrows b6/p6 into the four-wheel position. This movement f6 brings the front wheels 23 of the chair to the ground. It is unnecessary to point out that all the adjustment devices described above enable users to adapt the accessory 1 to the width of different wheelchairs and to the depth of the adapters fastened to the handles to ensure the continuity of the chair between backrest 9 and head-rest 17, or to adjust the angle of the wheelchair 2 in the tilted position. The horizontal position of the rear wheels 16 and anti-slip shoe 14 may be adjusted little by little for optimal safety.

It will be clear that the accessory described above is particularly suitable for providing wheelchair-users with a function they have hitherto been denied, namely a relaxation position. However, this type of apparatus may be suitable for producing a support prop for any wheel-mounted tilting apparatus.

What is claimed is:

1. Accessory for use with a wheelchair having two large rear wheels and two small front wheels, the accessory being designed to retain the wheelchair in a stable backward-tilting position to provide a disabled user with a relaxation position, and comprising a swinging prop structured and arranged to move freely in a plane of vertical symmetry, passing through a longitudinal axis of the wheelchair and mounted on a perpendicular, horizontally pivoting axle located approximately at the height of the top of a backrest between two lateral struts of a chassis supporting the backrest, retained by securement means; a lower section of said swinging prop being adjustable in length and provided with a stabilizing foot.

2. The accessory according to claim 1, further comprising a headrest mounted and fastened to the pivoting axle of the prop by fastening means which allow for angular adjustment around the pivoting axle to constitute an extension of the backrest when moved into the relaxation position, or to allow for folding of the wheelchair into a carrying position.

3. The accessory according to claim 1, wherein the stabilizing foot has the overall shape of an inverted letter T having a horizontal bar and a vertical bar, said foot being fastened to a lower end of the swinging prop such that the height of an assembly comprised of the prop and the foot is adjustable; and the horizontal bar of the inverted T is normally in the longitudinal axis of the wheelchair and provides an optimal bearing surface on the ground coordinating with bearing surfaces of the large rear wheels when in the relaxation position.

4. The accessory according to claim 3, wherein a rear end of the horizontal bar is fitted with an anti-slip device structured and arranged to prevent horizontal displacement of the stabilizing foot when the wheelchair moves forward, and so as to constitute a center of rotation for the accessory in the plane of vertical symmetry of the wheelchair.

5. The accessory according to claim 3, wherein a front end of the horizontal bar is fitted with at least one small wheel mounted on an axle perpendicular to the horizontal bar for facilitating a firm positioning of the horizontal bar on the ground while the wheelchair is being tilted backwards causing the swinging prop to move backwards.

6. The accessory according to claim 3, wherein the horizontal bar comprises a front end and a rear end, and the means for adjusting the length of the front and rear ends of the horizontal bar.

7. The accessory according to claim 6, wherein the swinging prop and the stabilizing foot are fitted on a sliding mounting to allow for longitudinal adjustment, and are firmly fastened longitudinally and circumferentially by removable locking means.

8. The accessory according to claim 7, wherein the horizontal pivoting axle of the swinging prop is fastened to two lateral struts of the chassis by two additional components each provided with a bore to receive two axles with radial control knobs mounted on the ends of the pivoting axle in which the axles may be displaced by normally being moved up by a spring.

9. The accessory according to claim 2, wherein the headrest comprises a support board shaped to receive a comfort accessory for supporting the user's head in the relaxation position.

10. The accessory according to claim 2, wherein the comfort accessory is a cushion held in place by elastic straps and made of a soft material, the cushion having a thickness which increases laterally so that when entirely or partially rolled upon itself, the cushion has the overall shape of a diabolo or hourglass.

* * * * *